United States Patent
Luciano, Jr.

(10) Patent No.: US 8,866,613 B2
(45) Date of Patent: Oct. 21, 2014

(54) BALL SEPARATION DEVICE FOR A GOLF RANGE TARGET

(75) Inventor: Robert Luciano, Jr., Reno, NV (US)

(73) Assignee: FS/SG IP Holdings, LLC, Vienna, VA (US)

( * ) Notice: Subject to any disclaimer, the term of this patent is extended or adjusted under 35 U.S.C. 154(b) by 87 days.

(21) Appl. No.: 13/212,850

(22) Filed: Aug. 18, 2011

(65) Prior Publication Data

US 2012/0058835 A1    Mar. 8, 2012

Related U.S. Application Data

(60) Provisional application No. 61/374,713, filed on Aug. 18, 2010, provisional application No. 61/375,555, filed on Aug. 20, 2010.

(51) Int. Cl.
| | |
|---|---|
| *G08B 13/14* | (2006.01) |
| *A63B 63/00* | (2006.01) |
| *G06F 17/00* | (2006.01) |
| *G01S 13/75* | (2006.01) |
| *G06K 19/04* | (2006.01) |
| *G01S 13/87* | (2006.01) |
| *G01S 19/39* | (2010.01) |

(52) U.S. Cl.
CPC ............. *G01S 13/878* (2013.01); *G01S 13/751* (2013.01); *G06K 19/04* (2013.01); *G01S 19/39* (2013.01)
USPC ...................... 340/572.1; 340/572.8; 273/348; 273/394; 273/402; 235/375

(58) Field of Classification Search
USPC ..................................................... 340/572.1
See application file for complete search history.

(56) References Cited

U.S. PATENT DOCUMENTS

| | | | |
|---|---|---|---|
| 3,889,957 A | | 6/1975 | Klabacka |
| 4,979,739 A | * | 12/1990 | Allen et al. ..................... 473/24 |
| 5,114,155 A | | 5/1992 | Tillery et al. |
| 5,370,389 A | * | 12/1994 | Reising .......................... 473/153 |
| 5,439,224 A | | 8/1995 | Bertoncino |
| 5,626,531 A | | 5/1997 | Little |
| 6,322,455 B1 | | 11/2001 | Howey |
| 6,569,028 B1 | | 5/2003 | Nichols et al. |
| 6,607,123 B1 | * | 8/2003 | Jollifee et al. ................. 235/375 |
| 6,974,391 B2 | | 12/2005 | Ainsworth et al. |
| 6,998,965 B1 | | 2/2006 | Luciano, Jr. et al. |
| 7,040,998 B2 | | 5/2006 | Jolliffe et al. |
| 7,052,391 B1 | | 5/2006 | Luciano, Jr. |
| 7,056,221 B2 | | 6/2006 | Thirkettle et al. |

(Continued)

*Primary Examiner* — Jennifer Mehmood
*Assistant Examiner* — John Mortell
(74) *Attorney, Agent, or Firm* — Michael A. Kerr; Kerr IP Group, LLC

(57) ABSTRACT

A ball separation device for a golf range target system is described. The ball separation device comprises a golf range target having a golf ball delivery shaft. A ball isolation system within the golf ball delivery shaft is configured to temporarily trap the ball within the shaft. A gate is configured to control the routing of a golf ball released from the ball isolation system. A control system queries the RFID reader while a ball is trapped in the ball isolation system. If the RFID reader receives a signal that identifies the golf ball as an RFID golf ball, the ball separation control system routes the ball to an RFID ball collector, otherwise, the ball is routed to a secondary location. After the determination is made as to where the trapped golf ball is to be routed, the ball isolation system releases the ball.

19 Claims, 14 Drawing Sheets

(56) References Cited

U.S. PATENT DOCUMENTS

| | | |
|---|---|---|
| 7,059,974 B1 | 6/2006 | Golliffe et al. |
| 7,160,196 B2 | 1/2007 | Thirkettle et al. |
| 7,337,965 B2 * | 3/2008 | Thirkettle et al. ............ 235/435 |
| 2003/0004005 A1 | 1/2003 | Ainsworth et al. |
| 2004/0214648 A1 | 10/2004 | Simpson |
| 2007/0167247 A1 | 7/2007 | Lindsay |
| 2011/0201437 A1 | 8/2011 | Fallow et al. |

* cited by examiner

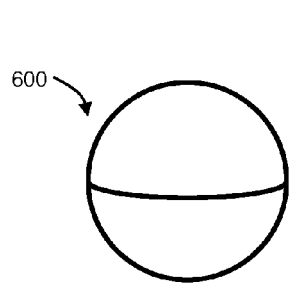
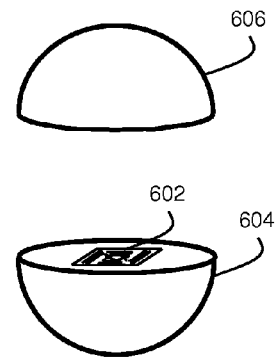
Figure 6A          Figure 6B
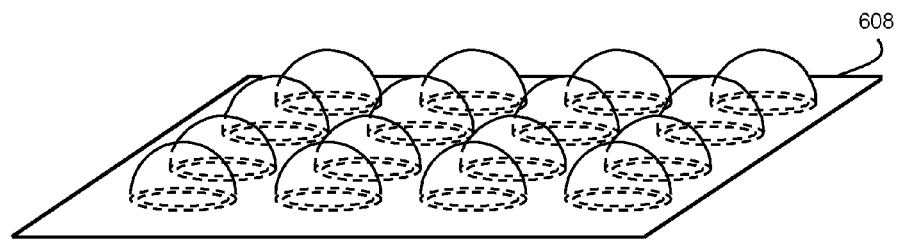
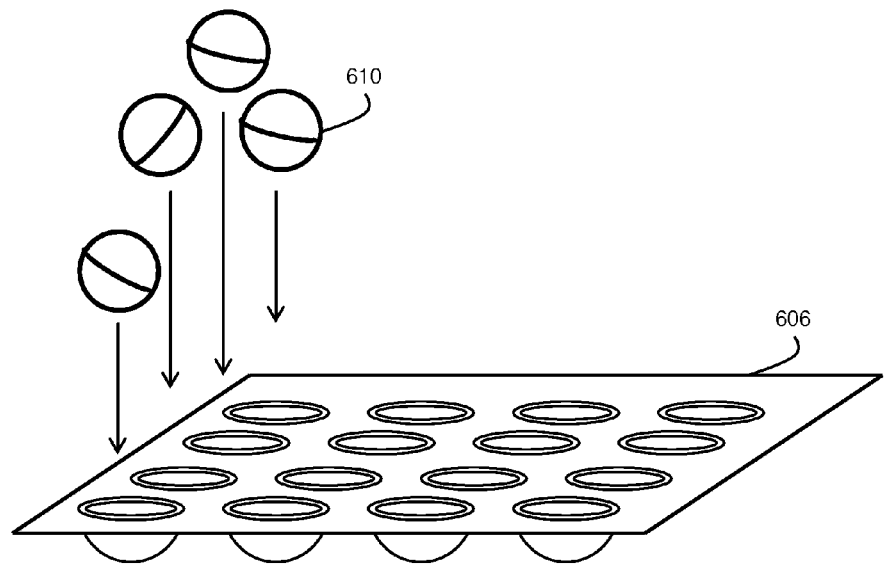
Figure 6C

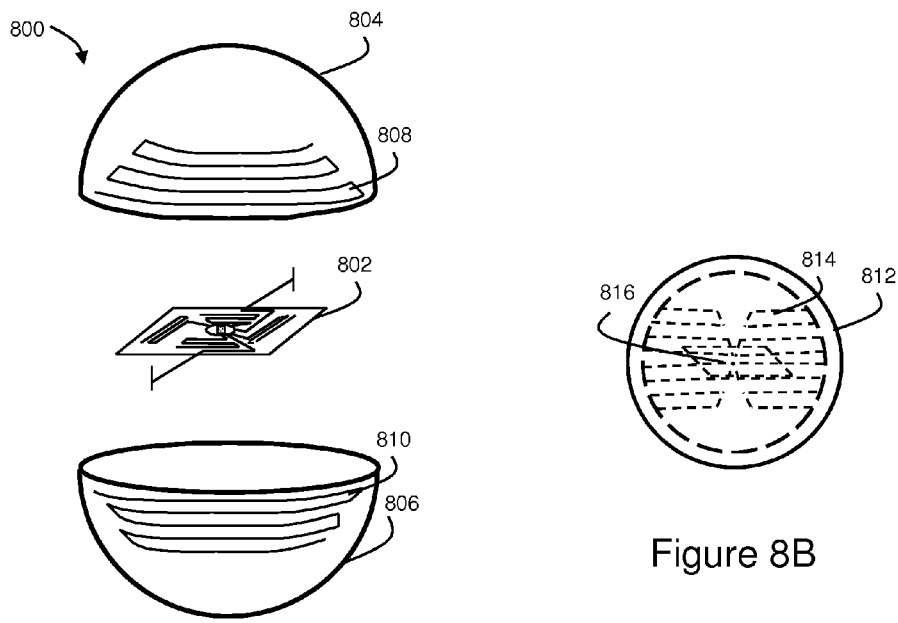
Figure 8A
Figure 8B
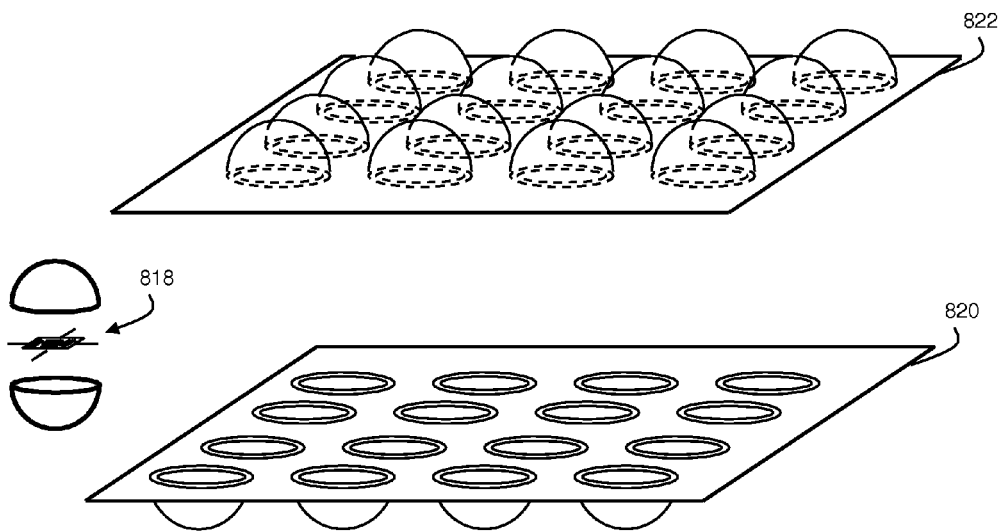
Figure 8C

BALL SEPARATION DEVICE FOR A GOLF RANGE TARGET

CROSS REFERENCE

This patent application claims the benefit of provisional patent application 61/374,713 filed on Aug. 18, 2010 and entitled MOVABLE GOLF RANGE TARGET WITH RFID BALL IDENTIFIER and claims the benefit of provisional patent application 61/375,555 filed on Aug. 20, 2010 and entitled BALL SEPARATION DEVICE FOR A GOLF RANGE TARGET.

FIELD

The present invention relates to a golf range target system and method for identifying golf balls with a golf range target. More particularly, the invention is related to a ball separation device capable of distinguishing between golf balls having RFID tags and golf balls lacking RFID tags. The ball separation device routes the golf balls based on the outcome of the determination.

BACKGROUND

Golf ranges have typical configurations. In payment for the use of the range, a player purchases a quantity of golf balls at the entry point to the range. The balls may be stored in buckets or dispensed into a bucket from a hopper. The player takes the balls to the tee area and hits the balls onto the range. The range has various markers for distance placed throughout the range. A player hits the ball and makes a visual estimate of the distance the ball traveled based on the landing location of the ball relative to the distance markers. Players would benefit from a system capable of accurately determining the distance of ball travel.

RFID tags embedded in golf balls have been used to allow a player to detect the distance of travel of a golf ball. For example, a player may use a handheld reader to detect the location of a golf ball after it is hit. However, some players may not wish to be burdened with a handheld reader during play.

Golf balls having RFID tags have been used in conjunction with ball collectors capable of reading the tags to determine the distance traveled by a golf ball hit onto a driving range.

SUMMARY

A ball separation device for a golf range target system is described. The ball separation device comprises a golf range target having a golf ball delivery shaft. A ball isolation system within the golf ball delivery shaft is configured to temporarily trap the ball within the shaft. The ball separation device further comprises an RFID reader and an actuator configured to change the configuration of a gate. The gate is configured to control the routing of a golf ball released from the ball isolation system. A ball separation control system is configured to query the RFID reader while a ball is trapped in the ball isolation system. If the RFID reader receives a signal that identifies the golf ball as an RFID golf ball, the ball separation control system routes the ball to an RFID ball collector. If the RFID reader determines that the trapped ball is not an RFID golf ball, the ball is routed to a secondary location. After the determination is made as to where the trapped golf ball is to be routed, the ball isolation system releases the ball.

A method for separating golf balls with a golf range target system is also described. The method includes capturing a golf ball in a golf range target, wherein the golf range target includes a golf ball delivery shaft. The method then proceeds to temporarily trap the ball within the golf ball delivery shaft with a ball isolation system. A ball separation control system queries the RFID reader when a ball is trapped in the ball isolation system. If the RFID reader determines that the trapped ball is an RFID golf ball, the ball separation control system proceeds to route the ball to an RFID ball collector. If the RFID reader determines that the trapped ball is not an RFID golf ball, the ball separation control system proceeds to route the ball to a secondary location. The method changes the configuration of a gate to control the routing of a golf ball released from the ball isolation system and releases the ball after the ball separation control system has made a routing determination and the gate configuration has been changed.

FIGURES

The illustrative embodiment will be more fully understood by reference to the following drawings which are for illustrative, not limiting, purposes.

FIGS. 6A-C show various states of manufacture of the illustrative 2D RFID golf ball.

Figure 7:
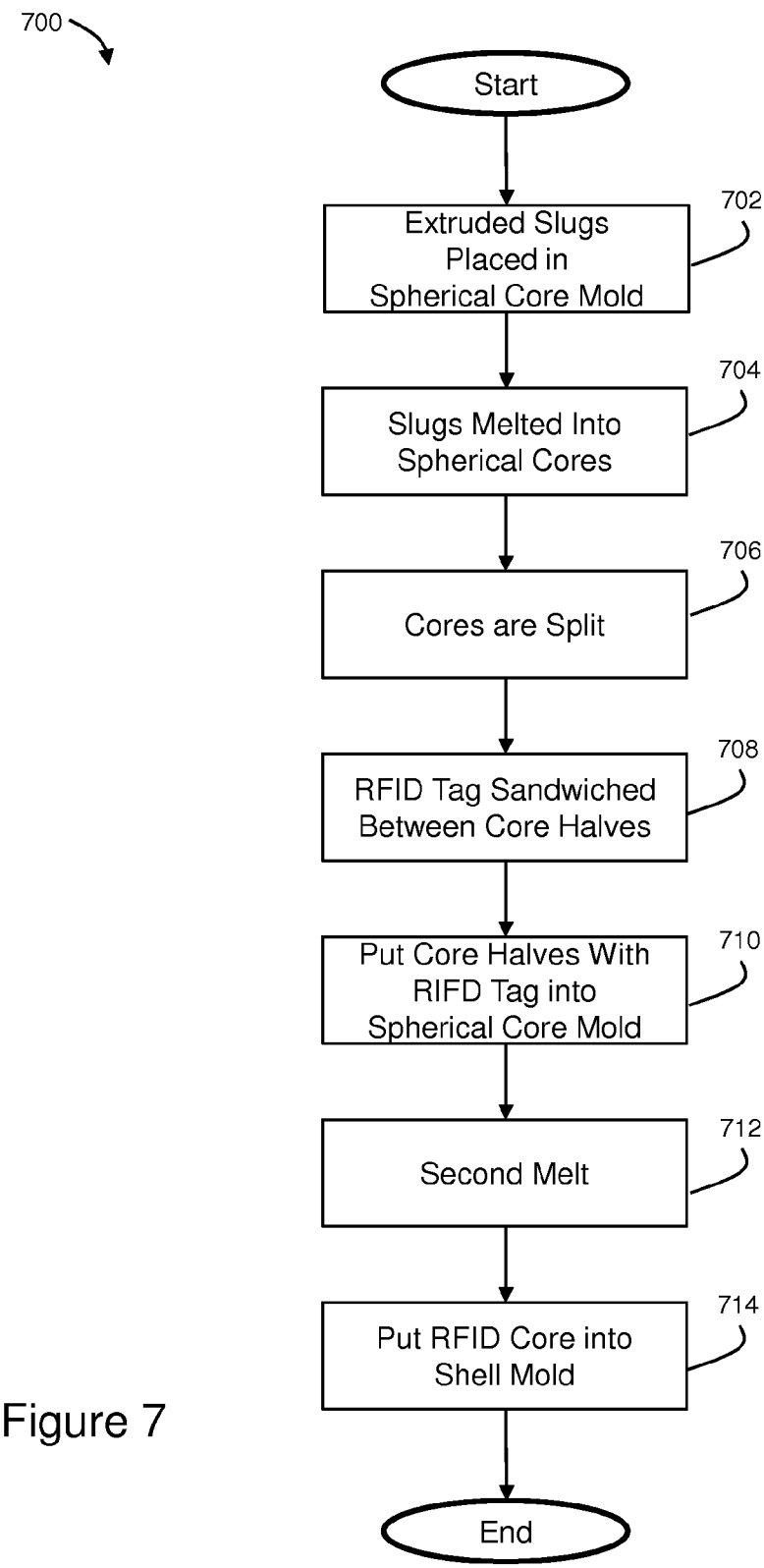

FIG. 7 shows an illustrative method for fabricating a 2D RFID golf ball.

FIGS. 8A-C show various states of manufacture of the illustrative omnidirectional RFID golf ball.

Figure 9:
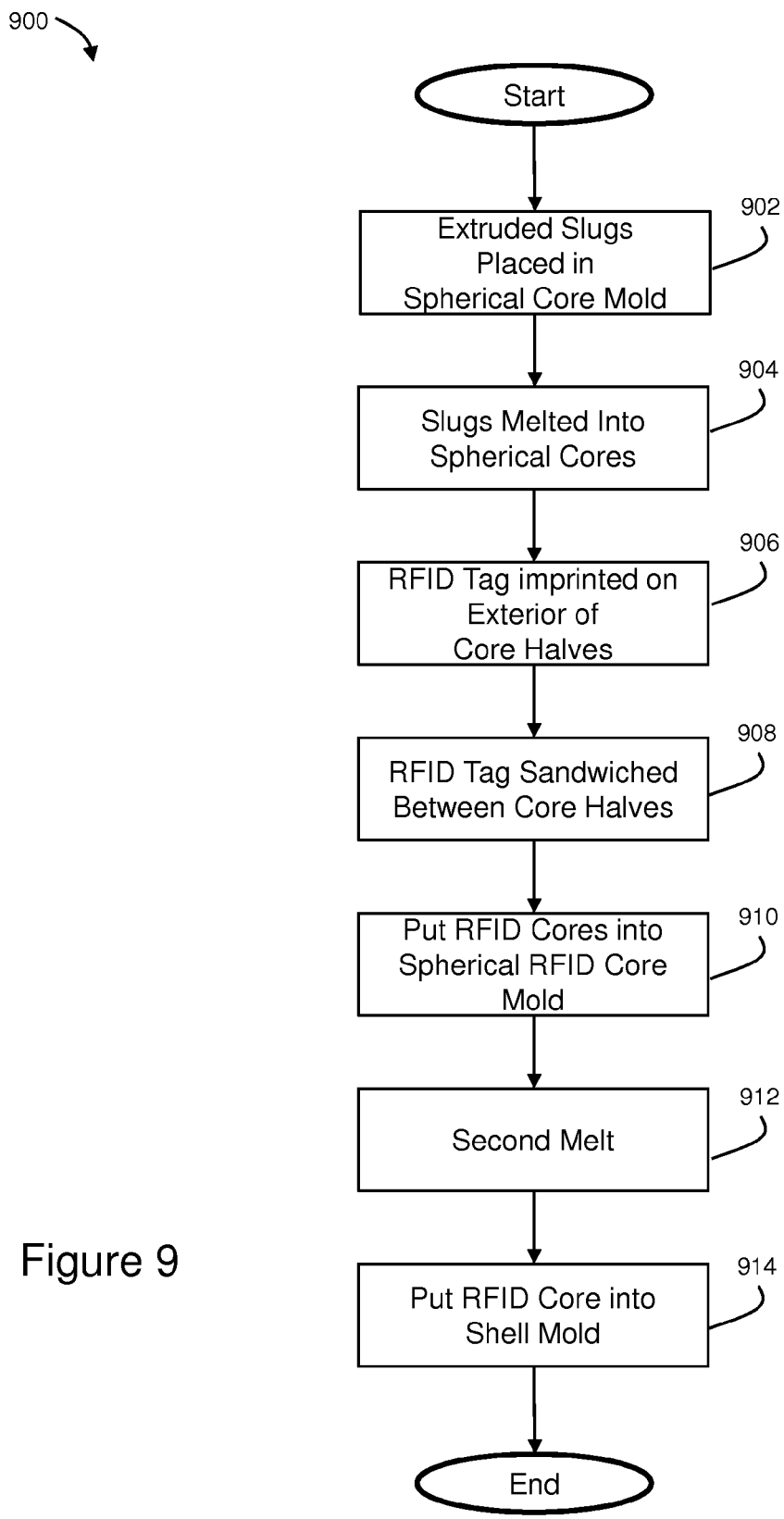

FIG. 9 shows an illustrative method for fabricating an omnidirectional RFID golf ball.

Figure 10A:
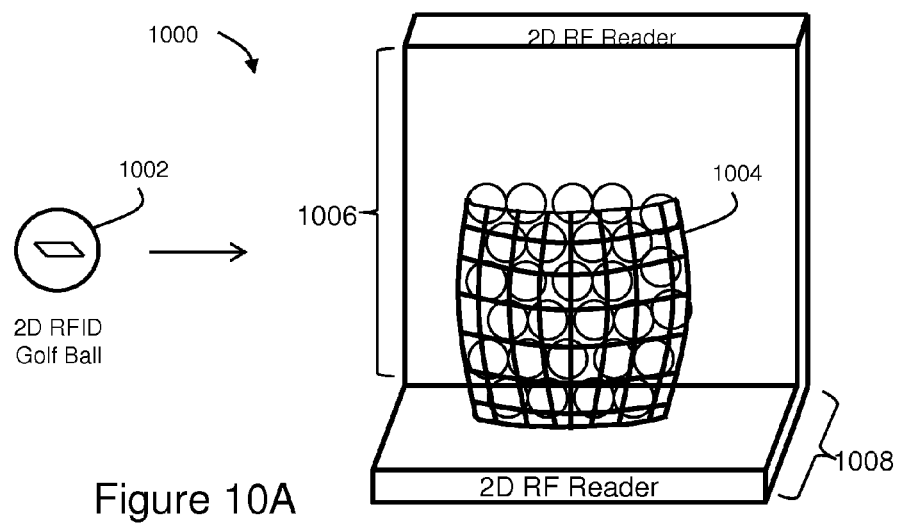

FIG. 10A shows an illustrative issue area RFID reader for a 2D RFID golf ball.

Figure 10B:
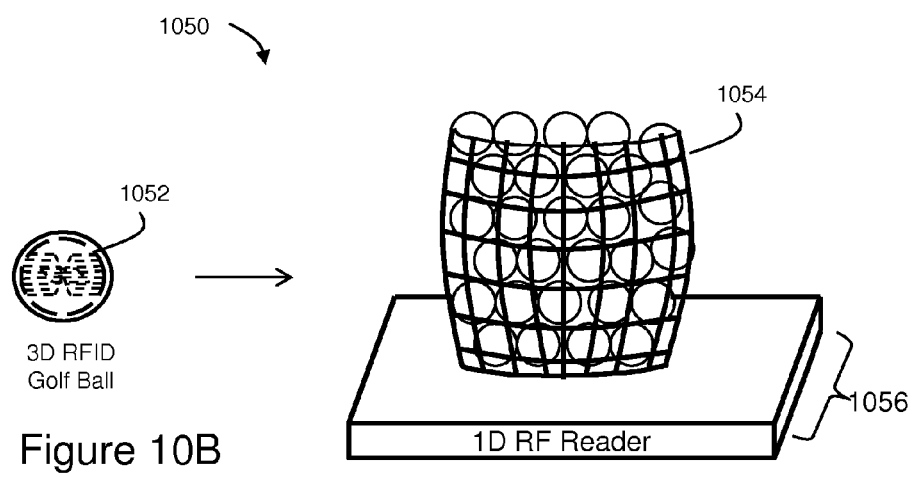

FIG. 10B shows an illustrative issue area RFID reader for an omnidirectional RFID golf ball.

Figure 11A:
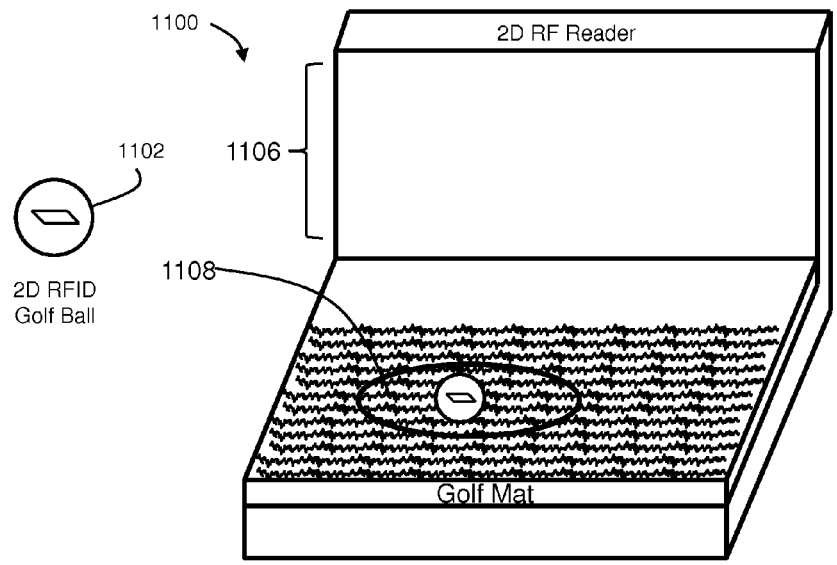

FIG. 11A shows an illustrative tee area RFID reader for a 2D RFID golf ball.

Figure 11B:
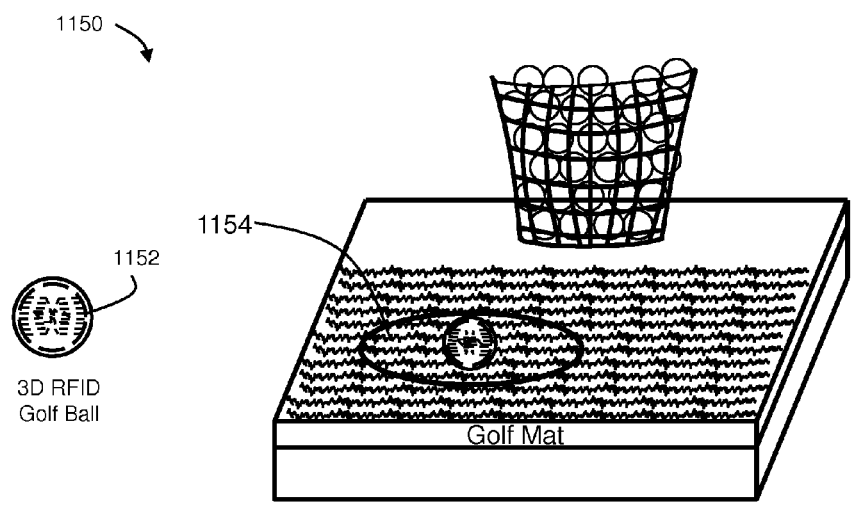

FIG. 11B shows an illustrative tee area RFID reader for a 3D RFID golf ball.

Figure 12A:
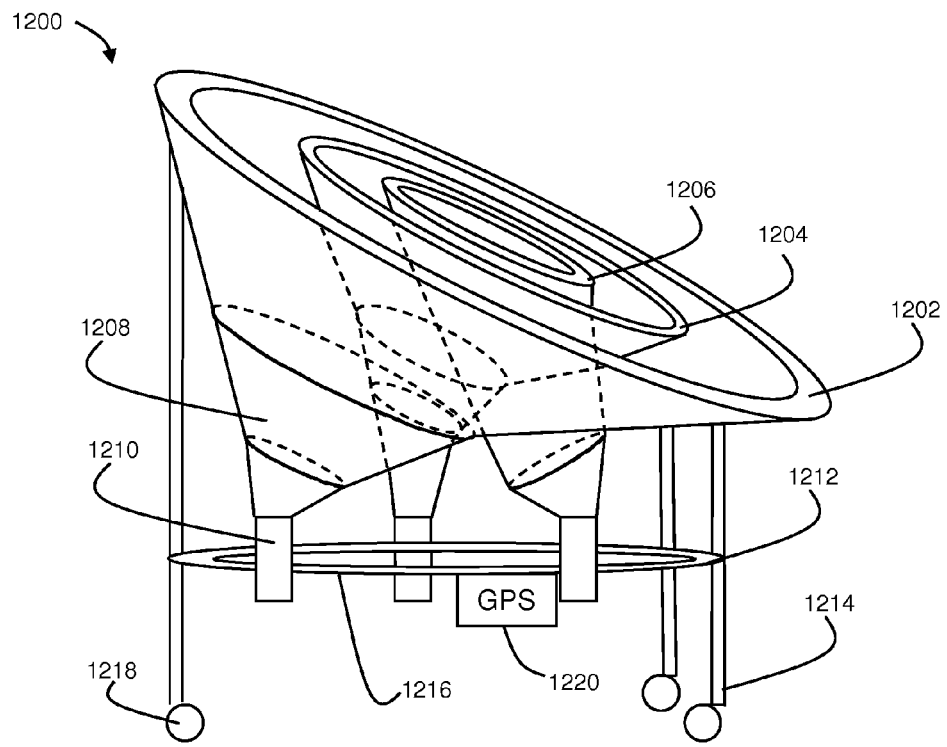

FIG. 12A shows an illustrative movable target having a plurality of nested funnels.

Figure 12B:
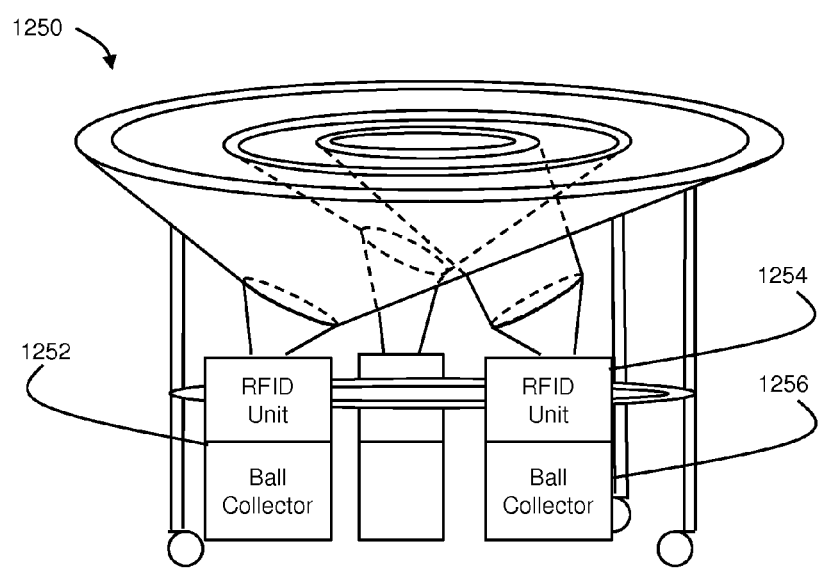

FIG. 12B shows an illustrative movable target having RFID-enabled ball receivers.

Figure 13A:
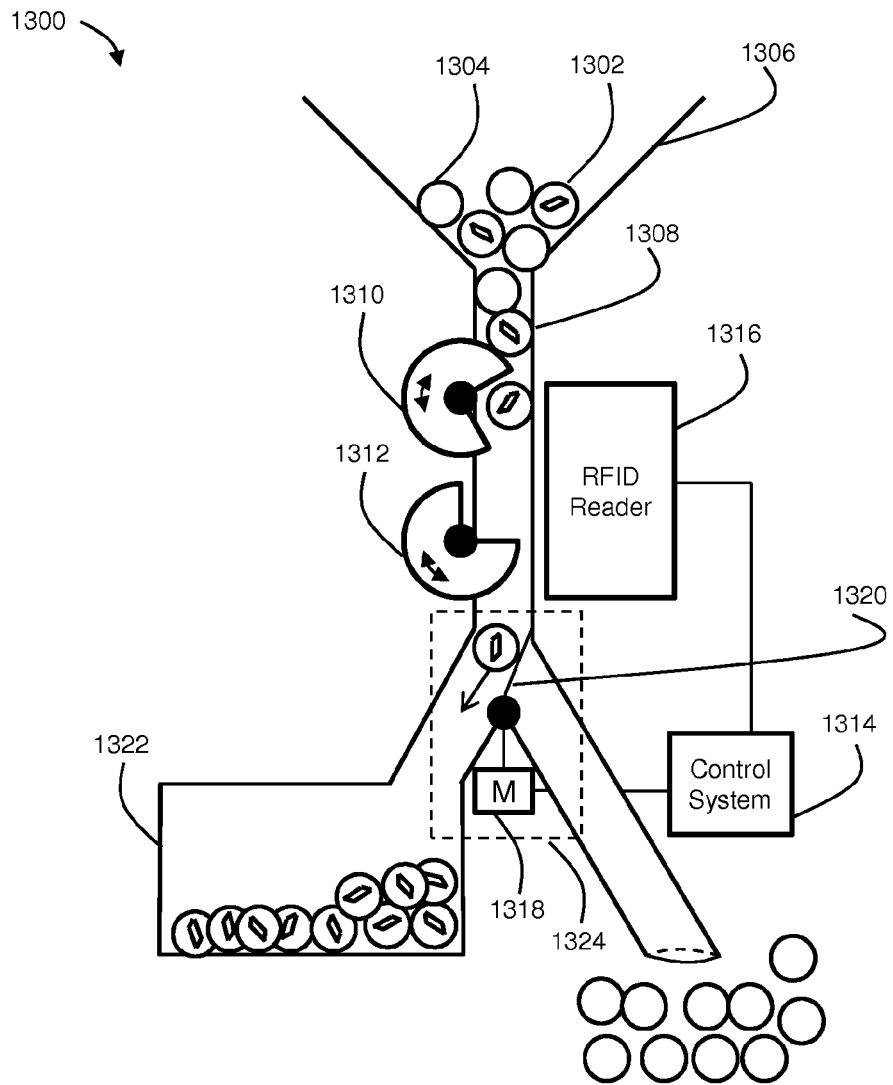
Figure 13B:
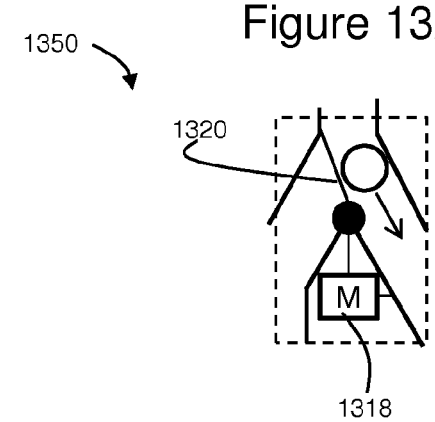

FIG. 13A-13B show an illustrative ball separation system.

Figure 14:
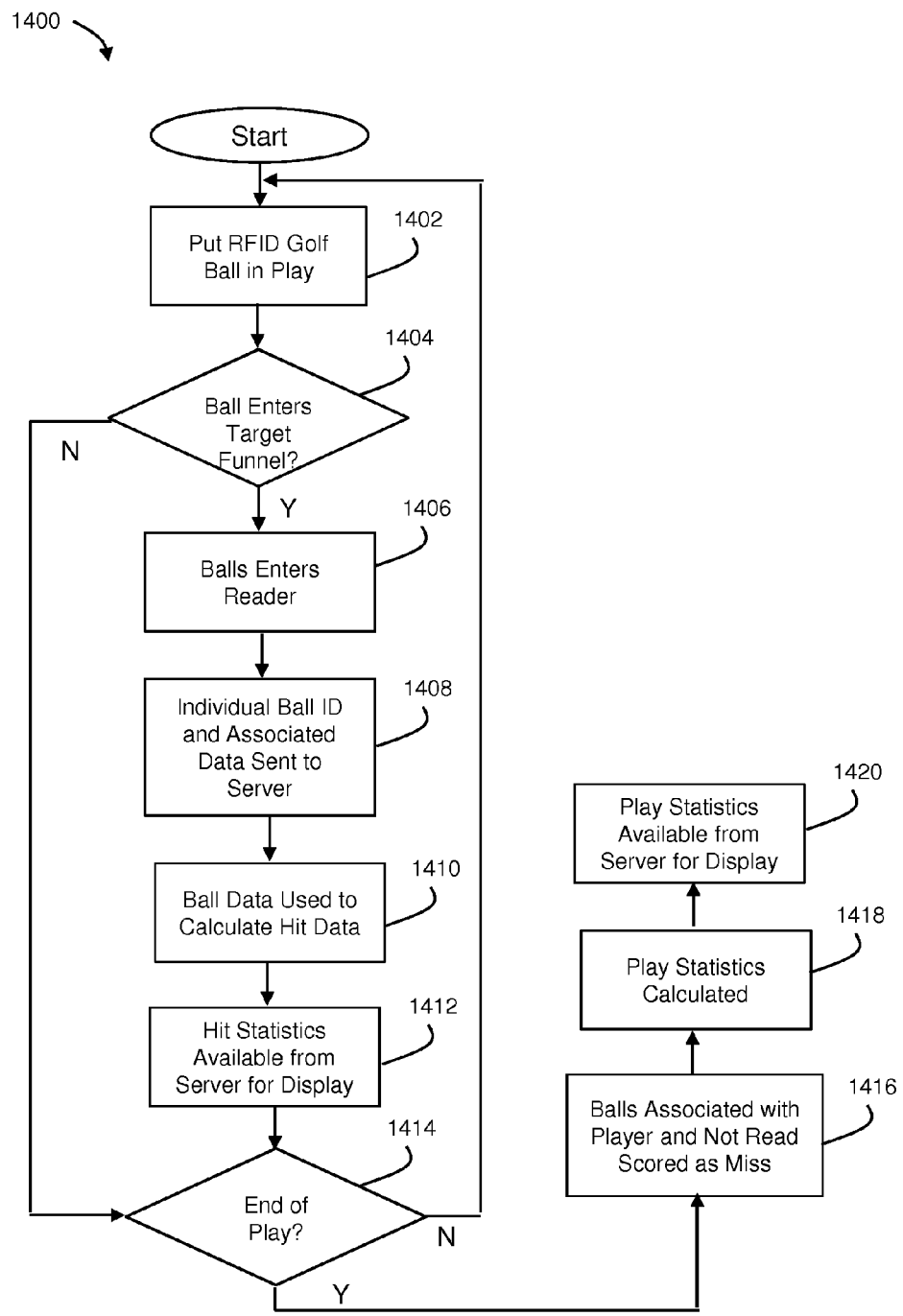

FIG. 14 shows an illustrative method for scoring driving range play using RFID-enabled movable targets.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the ball separation device for a golf range target systems and methods described hereinafter may vary as to configuration and as to details.

In an illustrative embodiment, a golf range target system includes golf balls having embedded RFID transponders ("RFID golf balls"), a series of RFID readers, and one or more movable driving range targets which may include one or more concentrically arranged targets. A player may bring a personal set of RFID golf balls to the range or may receive a set of RFID golf balls provided by the range. The set of RFID golf balls for the player are each identified by an issuing area RFID reader and a database entry associating the player with each ball in the set is created. The golf balls are taken to a tee box, from which the player will hit balls from a tee onto the driving range. When the golf ball is in the tee area, the golf ball identification is read by an RFID reader at the tee area. When the ball is hit onto the driving range, it may land in a target. The target contains an RFID reader that identifies the ball as it passes through the target. The targets are portable to allow repositioning of the targets on the range. The targets are equipped with GPS, allowing the position of the target relative to the tee area to be determined. In this manner, the player may receive feedback about, for example, the location and distance of travel of each ball that the player hit onto the range.

Figure 1A:
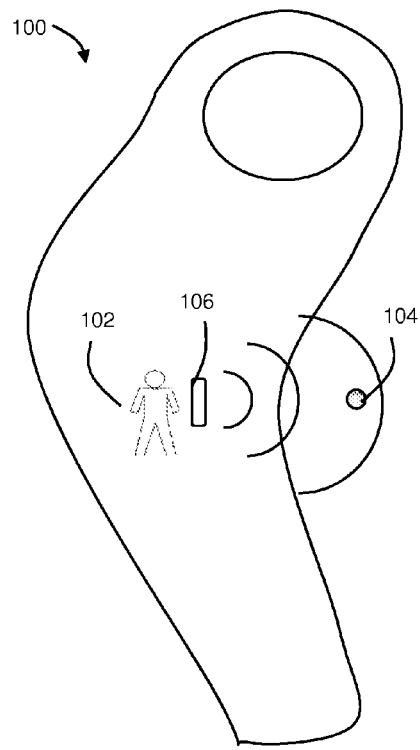
FIG. 1A shows a prior art system for determining the distance of travel of a golf ball.

Referring to FIG. 1A, a prior art system 100 for determining the distance of travel of a golf ball is shown. A player 102 hits a golf ball having embedded RFID tag 104. The player then uses a handheld RFID reader 106 to detect the golf ball. The handheld reader calculates the distance between the handheld reader and the golf ball.

Figure 1B:
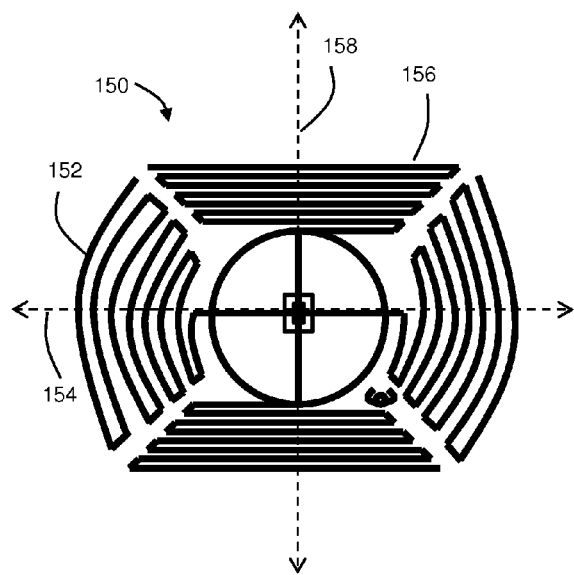
FIG. 1B shows a prior art RFID tag.

Referring now to FIG. 1B, a prior art RFID tag 150 is shown. The RFID tag includes a first antenna 152 oriented along a first axis 154 and a second antenna 156 oriented along a second axis 158 that is perpendicular to the first axis. The perpendicular arrangement of the antennae 152 and 154 allows the RFID transponder to be sensitive along the plane defined by the first axis and the second axis.

Figure 2:
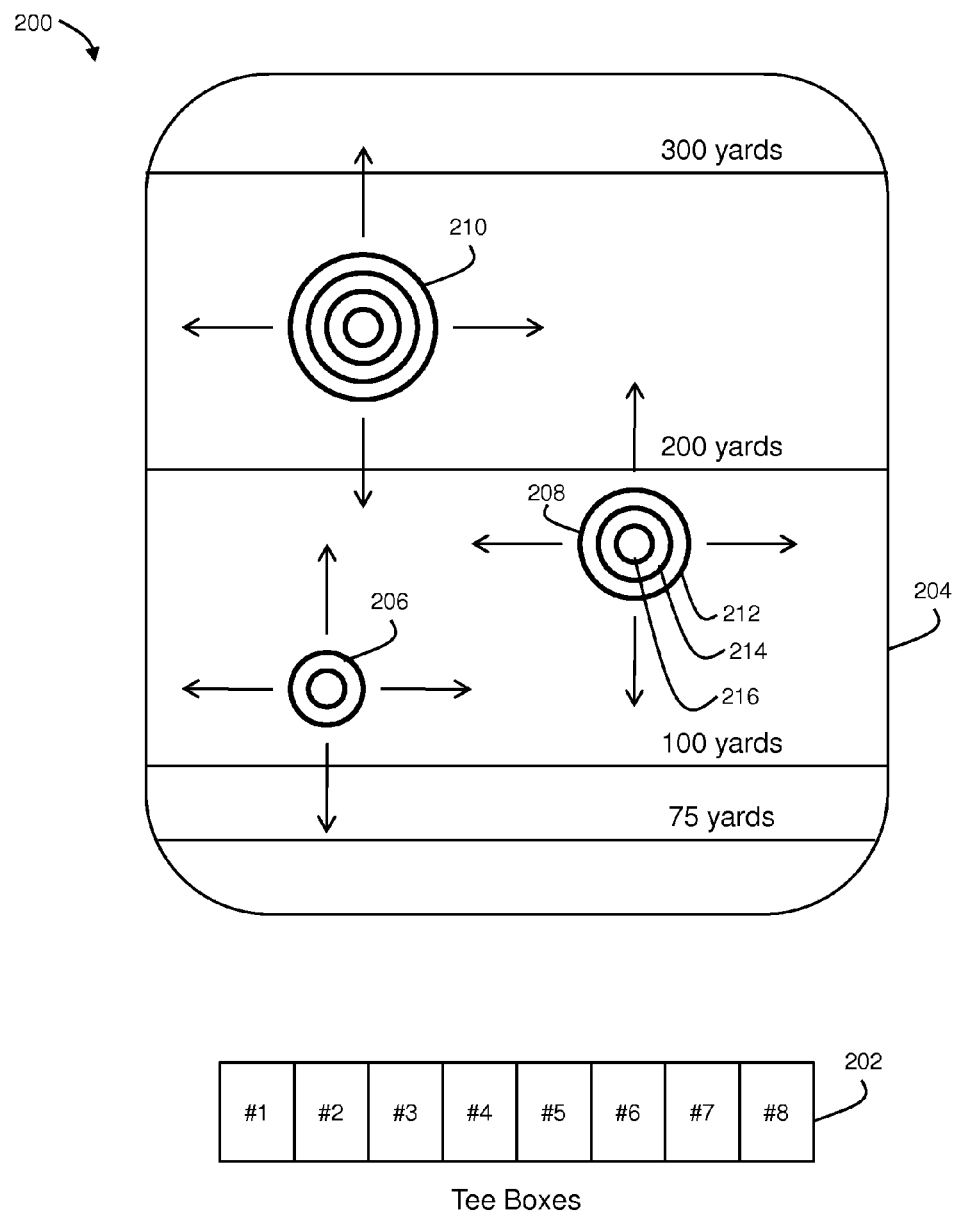
FIG. 2 shows an illustrative driving range having movable targets.

Referring to FIG. 2, an illustrative driving range 200 having movable targets is shown. Tee area 202 has tee boxes numbered #1 through #8. A player enters one of the tee boxes and hits a golf ball from the tee box onto the target area 204, with the objective of hitting a ball into one of the movable targets. Movable targets 206, 208, and 210 are shown. The arrows shown adjacent to the targets indicate that the targets are movable. Any of the targets may be relocated to any position on the target area 204.

The movable targets include at least one enclosed boundary capture component having a top boundary edge, a bottom boundary edge, and a tapering surface material that joins the top boundary edge to the bottom boundary edge. By way of example and not of limitation, the tapering surface material may be composes of a plastic UV resistant material. The shape of the enclosed boundary components can include curved sectors or segments that are connected to one another resulting in a variety of different sizes and shapes. Thus, the shape of the enclosed boundary capture component is determined by engineering and design constraints.

Figure 5:
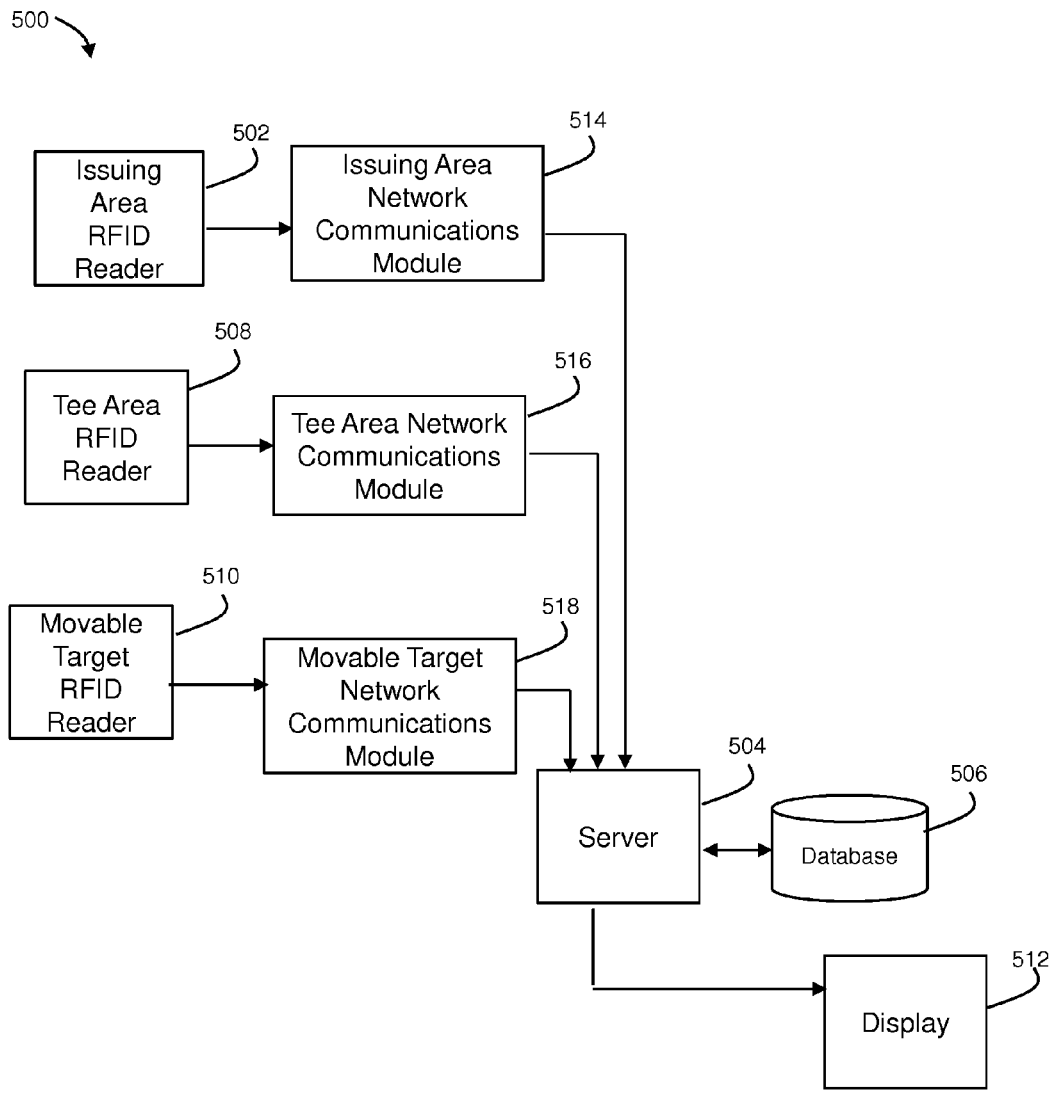
FIG. 5 shows an illustrative system diagram for the golf range target system.

In the illustrative embodiments presented herein, the movable golf range target system includes an issuing area RFID reader, which is presented in FIGS. 3, 10, 11 and 13. The movable target is shown in FIGS. 2, 12 and 13. The issuing area RFID reader is configured to read a plurality of RFID golf balls associated with a player, wherein each RFID golf ball has a unique identification. The RFID golf balls are shown in FIGS. 3, 6, 8 and 10. The issuing area RFID reader is communicatively coupled to an issuing area network communications module as shown in FIG. 5.

Referring now to FIG. 12, there is shown the movable target includes two enclosed boundary capture components, two target RFID readers and a GPS receiver. Additionally, the first enclosed boundary capture component has a first top boundary perimeter and a first bottom boundary perimeter, in which the first top boundary perimeter is configured to receive at least one RFID golf ball that subsequently travels through the first bottom boundary perimeter. A first target RFID reader is proximate to the first bottom boundary perimeter of the first enclosed boundary capture component and the first target RFID reader is configured to read the unique identification for each RFID golf ball that travels through the first bottom boundary perimeter. A second enclosed boundary capture component encompasses the first enclosed boundary capture component and the second enclosed boundary capture component has a second top boundary perimeter that is greater in length than the first top boundary perimeter. In the illustrative embodiment of FIG. 12, the second target RFID reader is proximate to a second bottom boundary perimeter of the second enclosed boundary capture component and the second target RFID reader is configured to read the unique identification for each RFID golf ball that travels through the second bottom boundary perimeter. The GPS receiver is coupled to the movable target and the GPS receiver is configured to determine a geographic location of the movable target.

For illustrative purposes the enclosed boundary capture component is presented as a funnel in FIG. 2 and FIG. 12. In the illustrative embodiments presented herein in FIG. 12A and FIG. 12B, the plurality of enclosed boundary capture components are presented as concentric funnels. The concentric funnels may be used to reward the accuracy of the hitting the target by awarding the player a higher point value for landing the ball within an interior funnel, with the highest point value awarded for landing a ball within the innermost funnel.

Referring back to FIG. 2, if the player is aiming for movable target 208, the player will be awarded a point value for landing a ball in exterior funnel 212. A higher point value is awarded for landing the ball in inner funnel 214. The highest point value for target 208 is awarded when the player is able to land a ball in innermost funnel 216.

Figure 3A:
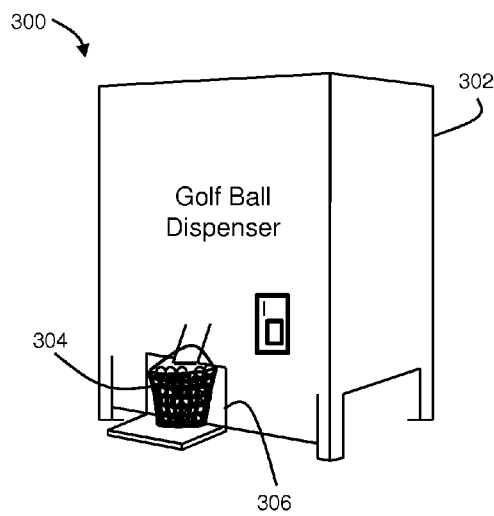
FIG. 3A shows an illustrative system for identifying multiple golf balls simultaneously at a golf ball dispenser.

Referring now to FIG. 3A, an illustrative system 300 for identifying multiple golf balls simultaneously at a golf ball dispenser is shown. The golf ball dispenser 302 is typically a hopper containing a large quantity of golf balls. The golf ball dispenser releases golf balls into bucket 304 via a chute. The golf ball dispenser may have a money insertion slot and/or credit card reader or other transaction facilitating device to receive payment for the dispensed balls. The dispenser may release a fixed quantity of balls or may release different quantities depending on the amount of money paid to the dispenser. In some embodiments, balls are released incrementally in groups having a number equivalent to a maximum number of balls that may be simultaneously read by the RFID reader. The golf ball dispenser may include an RFID reader 306, shown in more detail in FIG. 3B.

Figure 3B:
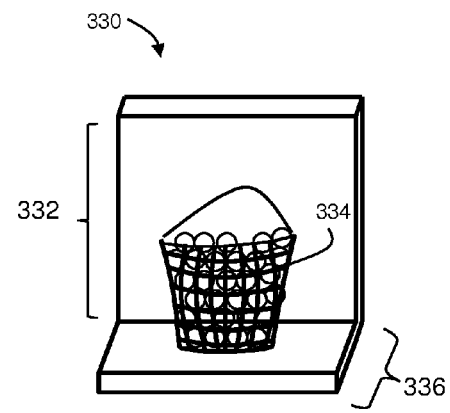
FIG. 3B shows an illustrative RFID reader for simultaneously identifying each ball in a collection of RFID golf balls.

Referring now to FIG. 3B, an illustrative RFID reader 330 for simultaneously identifying each ball in a collection of golf balls is shown. The reader component may comprise antennae located in horizontal panel 332 located adjacent to ball bucket 334 and in platform 336 on which the bucket 334 rests. The reader component detects the unique ID associated with the RFID transponders located within the golf ball. The reader is capable of detecting the ID of every golf ball located in the bucket. The RFID reader may operate using inductive coupling. In some embodiments, the RFID reader identifies the balls using backscatter coupling.

Figure 3C:
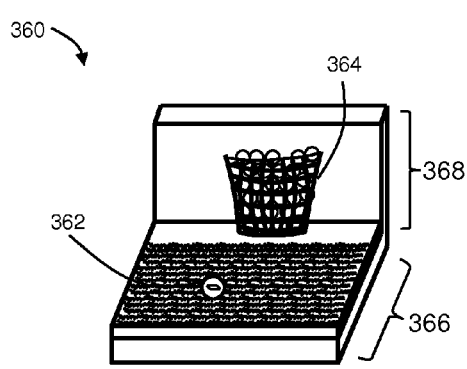
FIG. 3C shows an illustrative RFID reader for identifying a ball at a tee box.

Referring to FIG. 3C, an illustrative RFID reader 360 for identifying a ball at the tee box is shown. When the player arrives at the tee box, the player takes a ball 362 from the bucket 364 and places it on a tee in preparation to hit the ball onto the range. The ball may be identified by an RFID reader 366 when the ball is placed on the tee. The reader may be located, for example, in the platform below the tee. In some embodiments, each ball in the bucket is identified when the bucket is located in the tee box. In some embodiments, a reader for simultaneously identifying the collection of golf balls is located at the tee area. The reader for identifying all of the balls in a bucket may be located in a vertical panel 368 located adjacent to a designated area for resting bucket 364, or the reader may be located in a platform supporting the bucket.

Figure 4:
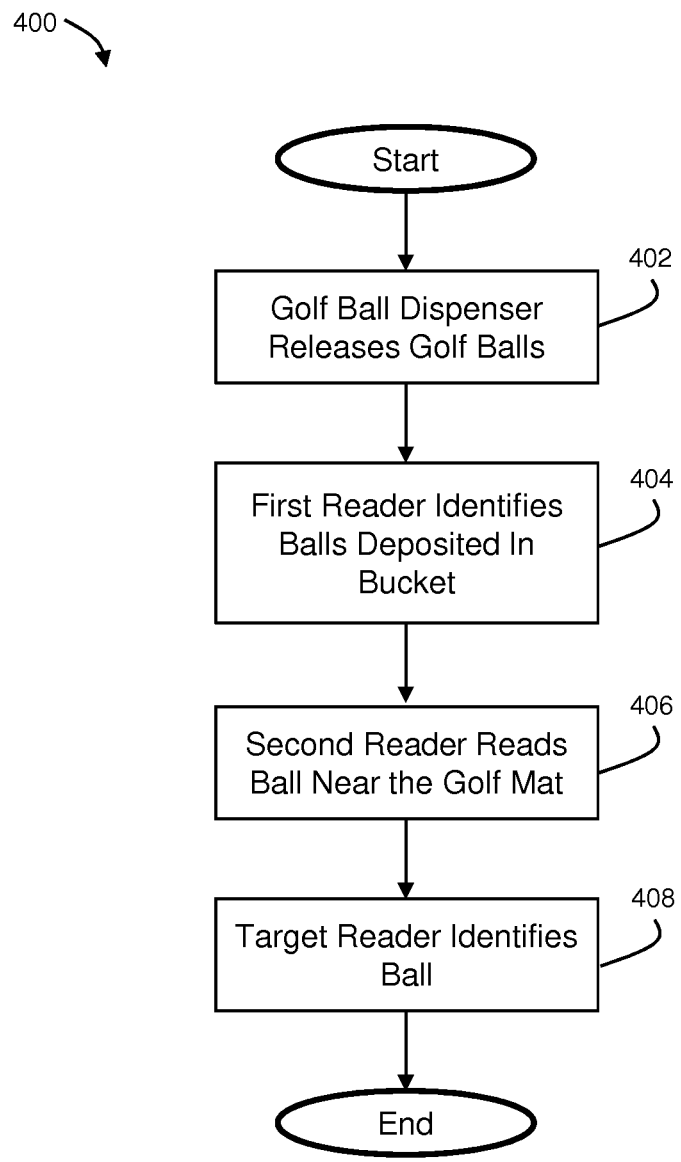
FIG. 4 shows an illustrative method for tracking RFID golf balls at a driving range.

Referring to FIG. 4, an illustrative method 400 for tracking RFID golf balls at a driving range is shown. The method begins at block 402 where the golf ball dispenser 302 receives a command to release a quantity of golf balls into a bucket. The method proceeds to block 404 where a RFID reader identifies all of the balls deposited into the bucket. At block 406, after the bucket has been transported from the golf ball dispenser area to the tee area, a second RFID reader located at the tee area reads a golf ball when it is at or near the tee box. At block 408, after a golf ball is hit from the tee and lands in a target area, the ball is read at the target area by another RFID reader.

Referring to FIG. 5, an illustrative system diagram 500 for the golf range target system is shown. In the illustrative embodiment, the player obtains a set of RFID golf balls dispensed by a golf ball dispenser such as that shown at 302 in FIG. 3. An issuing area RFID reader 502 may be a component of the golf ball dispenser, or may be located elsewhere at the driving range. The RFID golf balls are placed in or dispensed to an indicated designated area proximate to the issuing area RFID reader. Each RFID golf ball has a unique identification stored on the RFID transponder embedded within the ball. The issuing area RFID reader reads the unique identification from each of the plurality of balls. The issuing area RFID reader is communicatively coupled to an issuing area network communications module 514. The network communications module is a transmitter which sends a signal to another device on a network. The network may be, for example, a local area network or wide area network. The identification of each RFID golf ball in the player's set of RFID golf balls as detected by the issuing area RFID reader 502 is sent to server 504 via issuing area first network communications module 514. The server creates an entry in database 506 associating the identifications of the plurality of RFID golf balls with a unique identification associated with the player. The server and database may be located on site at the driving range. In some embodiments, the server or database or both the server and the database are located off site and receive communications from the RFID readers over, for example, a LAN or WAN. The server and database may be located in the same physical computer. Alternatively, an on-site server may be configured to communicate with an off-site server and database. Multiple databases may be used in conjunction with the one or more servers, located on-site, off-site, or both. A multiple-site driving range establishment may use multiple servers to allow information to be collected from and distributed to the multiple sites.

In the instance where a player brings a set of RFID golf balls to the range, the player may in some embodiments rely on a previously created database entry associating the player with the player's set of golf balls and avoid having to use the issuing RFID reader after the initial entry is created.

The database may be configured to store additional information associated with a player including, but not limited to, a record of the player's play history at the driving range, transactional information and account information. The player ID and other information associated with the player may be stored on a card having a magnetic stripe or other readable media. Alternatively, the player may be issued a PIN number or username and password combination associated with the player ID. In some embodiments, a temporary player account is created for short term use of the driving range. The player may receive a paper voucher indicating a temporary player ID in human readable and/or barcode form. A paperless system for issuing a temporary player ID may involve communicating the player ID to the player visually or audibly, or associating a particular tee box with the player's set of RFID golf balls.

At the tee area, the player removes a ball from the set of RFID golf balls and places it on a tee in preparation for hitting the ball onto the driving range. The identification of the individual golf ball is obtained by tee area RFID reader 508 and sent to server 504 via a tee area network communications module 516 communicatively coupled to the tee area RFID reader. The communication of an RFID golf ball identification from the tee area network communications module to the server may occur when the ball is placed on the tee (on arrival at the tee area) or when the ball is hit off of the tee (on departure from the tee area). In some embodiments, the identification of the RFID golf ball is communicated when the ball is placed on the tee and again when it is hit from the tee area.

The ball is hit towards the movable golf range target. An RFID golf ball landing within the movable target is read by an RFID reader 510 associated with the target. The ball ID detected by the movable target RFID reader is sent to server 504 via a movable target network communications module 518 communicatively coupled to the movable target RFID reader. For each ball that lands within a movable target, the server may determine the distance the ball traveled from the tee to the target based on the location of the target as established by a GPS receiver coupled to the target. The distance determination may also take into account the location of the tee as determined from a known location of the tee associated with the second RFID reader. If the movable targets are arranged on the range such that space exists between the targets, the server may determine that a ball missed all targets when an RFID golf ball identified by the second RFID reader is not subsequently identified by a target RFID reader. A timestamp associated with the time the ball left the tee may be sent to the server. The timestamp may be generated by the second RFID reader when it determines that the RFID golf ball has left the tee. Alternatively, the timestamp may be generated by beam interruption detection or similar method. Information such as whether the RFID golf ball landed in a target, a point tally, distance traveled by a ball, timestamp associated with each time the ball is hit, and statistics for a single driving range session or multiple driving range sessions may be presented to the player in various ways. For example, the information may be sent from server 504 to a display 512. The display may be, for example, a display mounted in the tee area or in another part of the driving range. In other embodiments, the information may be made available to the player for display on a handheld device or personal computer.

In some embodiments, no tee area RFID reader is used. In such embodiments, the RFID golf balls are associated with a player by the issue area RFID reader and read at the target area RFID reader.

In other embodiments, no issue area RFID reader is used. The one or more RFID golf balls are associated with a player at the tee area and read at the target area RFID reader.

Referring to FIGS. 6A-6C, various states of manufacture of the illustrative RFID golf ball are shown. A typical two-piece golf ball includes a core material encased in a molded shell. In FIG. 6A, a split core 600 is shown. In FIG. 6B, an RFID tag 602 is shown adjacent to the lower half 604 of the split core in preparation for sandwiching the RFID tag between the upper half 606 of the split core and the lower half of the core 604. The upper half of the core is placed on top of the lower half of the core 604 as shown at 610 and placed in a mold comprising lower tray 606 and upper tray 608 as shown in FIG. 6C. In the mold, the upper half of the core is melted to the lower half of the core such that the RFID tag is encased within the spherical core.

Alternatively, the illustrative RFID tag 150 is disposed on the outside or exterior of the core material, or on the exterior of a split core. The illustrative RFID tag 150 could be adhesively coupled to the exterior of the core material, or an annealing process could be used to couple the RFID tag to the core material, or the RFID tag could be printed on to the exterior of the core material using a conductive ink. The core material would then be encased in a molded shell that is dimpled.

Referring to FIG. 7, an illustrative method for fabricating an RFID golf ball is shown. As described above, a two piece golf ball includes a core material surrounded by a shell. The core material is fabricated from a slug. The slug may be a processed rubber that has been extruded and cut into a cylinder shape that is slightly larger than the size of a golf ball. The shell material is often rubber or a thermoplastic resin. The method begins at block 702 where the extruded and cut slugs are placed in a tray such as that shown at 606 in FIG. 6C. Lower tray 606 is driven toward an upper tray such as that shown at 608. As the trays are forced together, the slugs are molded and baked into sphere-shaped cores, as indicated at block 704. At block 706, the cores are split in half, illustrated at FIGS. 6A-6B. At block 708, an RFID tag is sandwiched between the two halves of the split core, as illustrated at FIG. 6B. At block 710, for each core, the assembly comprising a lower core half and an upper core half with an RFID sandwiched between the halves is inserted into a spherical core mold as shown in FIG. 6C. At block 712, the cores are melted for a second time to bond the core halves together and trap the RFID tag within the core. At step 714, the cores containing RFID tags are placed in a shell mold that surrounds the core with shell material.

Referring now to FIGS. 8A-C, various states of manufacture of the illustrative golf ball having multiple RFID tags oriented such that the golf ball identification may be read regardless of the golf ball orientation relative to the RFID reader ("omnidirectional RFID golf ball") are shown. In FIG. 8A, a split core 800 is shown. An RFID tag 802 is shown positioned between the upper half 804 and the lower half 806 of the split core. RFID tag segments 808 and 810 are shown imprinted on the exteriors of core halves 804 and 806, respectively.

The conductive antenna tag segments 808 and 810 are disposed on the outside or exterior of the split core. The tag segments 808 and 810 could be adhesively coupled to the exterior of the core material, or an annealing process could be used to couple the antenna tag segments to the core material, or the tag segments 808 and 810 could be printed on to the exterior of the core material using a conductive ink. The core material would then be encased in a molded shell that is dimpled.

In FIG. 8B, the omnidirectional RFID golf ball 812 is shown in section after the upper half 804 of the core is joined to the lower half 806. As indicated in FIG. 8B, RFID tag segments 808 and 810 form a second RFID tag 814 that is oriented perpendicular to RFID tag 816 (also shown at 802 in FIG. 8A).

FIG. 8C illustrates the configuration of the core halves, RFID tag and spherical core mold trays in preparation for a second melt. The core halves are assembled such that RFID tag is sandwiched between the upper core half and the lower core half as shown at 818. Core assembly 818 is placed in a core mold comprising lower tray 820 and upper tray 822. In the mold, the upper half of the core is melted to the lower half of the core such that RFID tag 802 is encased within the spherical core.

Referring to FIG. 9, an illustrative method for fabricating an omnidirectional RFID golf ball is shown. The method begins at block 902 where the extruded slugs are placed in a core mold tray such as that shown at 820 in FIG. 8C. Lower tray 820 is driven toward an upper tray such as that shown at 822. As the trays are forced together, the slugs are molded and baked into sphere-shaped cores, as indicated at block 904. At block 906, RFID tag segments are imprinted with conductive ink on the exteriors of the core halves as illustrated at FIG. 8B. At block 908, an RFID tag is sandwiched between the two halves of the split core, as illustrated at 818 in FIG. 8C. At block 910, for each core, the assembly comprising a lower core half and an upper core half with an RFID sandwiched between the halves is inserted into a spherical core mold as shown at 818. At block 912, the cores are melted for a second time to bond the core halves together and trap the RFID tag within the core. At step 914, the cores containing RFID tags are placed in a shell mold that surrounds the core with shell material.

Referring to FIG. 10A, an illustrative issue area RFID reader 1000 for a golf ball 1002 containing a two-dimensional RFID tag ("2D RFID golf ball") is shown. The RFID reader may be a component of a golf ball dispenser such as the dispenser shown at FIG. 3A. Alternatively, the RFID reader may be a standalone unit. A bucket 1004 contains a plurality of 2D RFID golf balls such as the one shown at 1002. An RFID reader having a two-dimensional antenna array ("2D RFID reader") is used to simultaneously identify the plurality of 2D RFID golf balls located in the bucket. The 2D RFID reader includes a first antenna located in vertical panel 1006 and a second antenna located in a platform 1008 on which the bucket 1004 rests.

Referring now to FIG. 10B, an illustrative issue area RFID reader 1050 for an omnidirectional RFID golf ball ("3D RFID golf ball") 1052 is shown. The 3D RFID golf ball is illustrated at FIGS. 8A-8B. A bucket 1054 contains a plurality of 3D RFID golf balls such as the one shown at 1052. Advantageously, an RFID reader having a single antenna ("1D RFID reader") may be used to simultaneously identify the plurality of 3D RFID golf balls located in the bucket (as opposed to the 2D RFID golf ball which requires a 2D RFID reader). The 1D RFID reader is located in platform 1056 on which the bucket 1054 rests. Alternatively, the 1D RFID reader may be located in a vertical panel.

Referring to FIG. 11A, an illustrative tee area RFID reader 1100 for a 2D RFID golf ball 1102 is shown. A 2D RFID reader is used to identify the 2D RFID golf ball before it is hit. The 2D RFID reader includes a first antenna located in vertical panel 1106 and a second antenna located in a platform 1108 below the 2D RFID golf ball when it is on a tee.

Referring now to FIG. 11B, an illustrative tee area RFID reader 1150 for a 3D RFID golf ball 1152 is shown. A 1D RFID reader is used to identify the 3D RFID golf ball before it is hit. The 1D RFID reader is located in platform 1154 below the 2D RFID golf ball when it is on a tee. Alternatively, the 1D RFID reader may be located in a vertical panel.

Referring to FIG. 12A, an illustrative movable target 1200 having a plurality of nested enclosed boundary capture components is shown. For illustrative purposes, the enclosed boundary capture components are presented as funnels, in which the target includes an exterior funnel 1202, one or more inner funnels 1204, and an innermost funnel 1206. Each illustrative funnel has a wide perimeter and a narrow perimeter. A ball landing within the wide perimeter subsequently travels to the narrow perimeter via a guide 1208. In some embodiments, a ball landing within the funnel is directed by the funnel to a receiver proximate to the narrow opening of the funnel. For example, funnel 1202 directs a ball landing within the opening indicated at 1202 via guide 1208 to ball receiver 1210. The funnels are mounted on frame 1212. The frame is shown comprising legs 1214 mounted to ring 1216. However, it will be recognized that other frame configurations may be used to support the nested funnels. The frame is shown mounted on caster wheels 1218. In some embodiments, the target does not have wheels. The target may incorporate non-wheel elements that enable the target to be moved, such as a lightweight frame, sleds mounted to the underside of the frame, or a frame configured to make the target transportable by forklift. In one embodiment, the target includes a GPS unit 1220 comprising a GPS receiver and a GPS network communications module. The GPS receiver is used to determine the location of the movable target relative to the driving range. The GPS unit transmits to server 504 a signal comprising the location detected by the GPS receiver and an identification associated with the movable target.

The nested funnels of the target may be oriented such that the funnel openings are parallel to the ground, as shown in FIG. 12B, or such that the funnel openings are not parallel to the ground, as shown in FIG. 12A. In some embodiments, the orientation of the funnel openings may be adjustable, for example, by adjusting the length of one or more of the legs of the frame.

Referring to FIG. 12B, an illustrative movable target 1250 having RFID-enabled ball receivers is shown. A RFID-enabled ball receiver 1252 includes an RFID unit and a ball collector 1256. The RFID unit includes a movable target RFID reader 1254 and a movable target network communications module. In some embodiments, a single movable target network communications module is associated with all RFID readers associated with a target. The RFID unit may be coupled to the target frame 1212. In some embodiments, the RFID unit is physically separate from the target and rests on the ground. An RFID golf ball entering one of the target funnels, such as funnel 1202, is channeled to the corresponding receiver, i.e. receiver 1210, which in some embodiments is an RFID-enabled ball receiver 1252. The identification associated with the RFID golf ball is detected by the RFID reader as the RFID golf ball passes through the RFID unit. The RFID unit transmits to server 504 a signal comprising the identification of the RFID golf ball and an identification associated with the funnel in which the ball landed. The ball is then deposited in the ball collector.

In some embodiments, one or more network communications modules associated with an RFID unit may be communicatively coupled to the GPS unit. In lieu of a GPS network communications module, the GPS unit may share a network communications module with one or more RFID units. The RFID unit network communications module may send to server 504 a signal comprising the identification of the ball using a wireless network (not shown), the identification of the funnel in which the ball landed, and the location of the target. The signal may include additional information such as the time at which the ball landed.

Referring to FIG. 13A, an illustrative ball separation system 1300 is shown. In some embodiments, the ball separation system is used to separate RFID golf balls, such as the ball indicated at 1302, from golf balls lacking RFID tags ("non-RFID golf ball"), such as the ball indicated at 1304. The ball separation system is coupled to the guide 1306 of a funnel, such as guide 1208 shown in FIG. 12A. A ball falls from guide 1306 into column 1308 and is temporarily trapped between first separation component 1310 and second separation component 1312.

The first separation component 1310 and the second separation component 1320 function as golf ball separators. By way of example and not of limitation, the first and second separation components 1310 and 1312, may be embodied as partial discs as shown in FIG. 13A, as a spoke arrangement, as a turnstile, or any other such golf ball separators.

For example, a ball falls from guide 1306 into a ball isolation system within column 1308. The ball isolation system may comprise a first partial disc 1310 and a second partial disc 1312. The first partial disc rotates such that a single golf ball enters the ball isolation system. The second partial disc is rotated such that the ball cannot exit the ball isolation system. The first and partial discs may be controlled by ball separation control system 1314 or by an independent control system. In some embodiments, the ball isolation system comprises a single partial disc (not shown). The golf ball is temporarily trapped within the opening in the single partial disc.

While the ball is trapped, ball separation control system 1314 determines whether the ball is an RFID golf ball or a non-RFID golf ball using RFID reader 1316. RFID reader 1316 may be an RFID reader of an RFID unit, such as RFID reader 1254 of RFID unit 1252 indicated in FIG. 12B. In some embodiments, the ball isolation system comprises a helical ramp (not shown) configured such that the RFID tag embedded in the RFID golf ball rotates at least 180 degree relative to an antenna of the RFID reader as the golf ball rolls down the ramp. The rotation of the golf ball ensures that the antenna will be able to read a 2D RFID golf ball. Because the RFID antenna may not be able to read an RFID tag within a 2D RFID golf ball when the RFID tag is oriented substantially parallel to the orientation of the waves emitted by the antenna, the rotation of the golf ball continually changes the orientation of the golf ball such that the RFID reader is able to obtain a reading.

If the ball is an RFID golf ball, control system 1314 instructs actuator 1318 to position ball separator gate 1320 such that the RFID golf ball is directed to RFID ball collector 1322. Referring to FIG. 13B, the area of ball separation system indicated in box 1324 is shown with ball separator gate 1320 in a second position that routes non-RFID golf balls into a collection area for non-RFID golf balls. When a non-RFID golf ball is trapped between ball separators 1310 and 1312, the control system 1314 uses RF Reader 1316 to determine that the ball is a non-RFID golf ball. The control system then instructs motor 1318 to position ball separator gate 1320 such that the non-RFID golf ball is directed to a collection area for non-RFID golf balls as indicated in FIG. 13B. The non-RFID golf balls may be deposited on the ground or the non-RFID golf balls may be collected in a non-RIFD golf ball collector vessel. It will be recognized that alternative mechanical or electrical systems may be used to route the balls according to the RFID status of the ball.

Referring to FIG. 14, an illustrative method 1400 for scoring driving range play using RFID-enabled movable targets is shown. The method begins at block 1402, at which the RFID golf ball is put into play by a player hitting the ball on to the driving range. In some embodiments, the RFID golf ball has been associated with a player identification prior to being put into play, for example when an issuing area RFID reader identifies balls deposited in a bucket as described is reference to FIGS. 4 and 5. The method proceeds to decision diamond 1404 where it is determined whether the RFID golf ball has entered a target funnel, such a target funnel shown in FIGS. 12A-B. As indicated at block 1406, if the RFID golf ball entered a target funnel, the RFID golf ball is identified by a reader such as reader 1254 shown in FIG. 12B. The method proceeds to block 1408, at which the ball ID and associated data are sent to server 504, as described in reference to FIG. 5. The associated data may include, for example, an identification of the target, a location of the target as determined by a GPS receiver associated with the target, and a time at which the ball landed in the target. The method proceeds to optional block 1410, at which ball data may be used by the server to calculate data corresponding to a particular hit. For example, the speed, distance, normalized distance, accuracy, point value, and cost (e.g., on a driving ranged used for gaming) associated with a hit may be determined. At optional block 1412, the data generated by the server for a particular hit may be made available for display to the player. For example, the player may be able to view the statistics on a display located at the driving range or on a handset or personal computer having an application configured to communicate with server 504. At decision diamond 1414, it is determined whether play has ended. For example, it may be determined that play has ended if all of the RFID golf balls associated with a player have passed the second reader (and thus were hit from the golf mat onto the driving range). If play has ended, the method proceeds to optional block 1416, at which the server determines that all RFID golf balls that passed the second reader but were not read at a target missed all targets, and are thus scored as "miss." At optional step 1418, the server calculates statistical or summary information applicable to all balls played in the session. For example, statistical or summary information pertaining to distance, speed, accuracy, point value, cost, and missed balls may be calculated by the server. At block 1420, the statistics or summary information are made available for display to the player, for example, on a display at the driving range, a handset, or a personal computer.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A ball separation device for a golf range target system comprising:
   a golf range target comprising a golf ball delivery shaft;
   a gravity fed ball isolation system that includes a partial disc within the golf ball delivery shaft configured to rotate to temporarily trap a golf ball within the shaft, wherein the partial disc is rotatable and the ball is temporarily trapped within a cutout of the partial disc;
   an RFID reader;
   an actuator configured to change the configuration of a gate, the gate configured to control the routing of the golf ball released from the ball isolation system;
   a ball separation control system configured to query the RFID reader when the ball is isolated in the ball isolation system;
   the ball separation control system configured to communicate with the RFID reader and determine if the trapped ball is an RFID golf ball, and then route the ball to an RFID ball collector;
   the ball separation control system configured to communicate with the RFID reader and determine if the trapped ball is not an RFID golf ball, and then route the ball to a secondary location; and
   the ball isolation system further configured to release the ball after the control system has made a routing determination.

2. The ball separation system of claim 1, wherein the ball isolation system comprises a first separation component that includes a first partial disc and a second separation component that includes a second partial disc, the separation components coupled to the ball delivery shaft; and
   the first separation component configured to rotate to permit the golf ball to enter the shaft and the second separation component configured to temporarily trap the ball between the first separation component and the second separation component.

3. The ball separation system of claim 1, wherein the ball isolation system comprises a single separation component coupled to the ball delivery shaft, the single separation component includes a partial disc configured to rotate to permit the ball to enter but not exit the shaft, trapping the ball within the shaft.

4. The ball separation system of claim 1, wherein the ball isolation system is controlled by the ball separation control system.

5. The ball separation system of claim 1, wherein the ball isolation system is controlled by an independent control system.

6. The ball separation system of claim 1, wherein non-RFID golf balls are deposited in a non-RFID golf ball collector.

7. The ball separation system of claim 1, wherein non-RFID golf balls are deposited on the ground.

8. A ball separation device for a golf range target system comprising:
   a golf range target comprising a golf ball delivery shaft;
   an RFID reader;
   a gravity fed ball isolation system within the golf ball delivery shaft configured to temporarily trap a golf ball within the shaft, the ball isolation system comprising a helical ramp configured such that an RFID tag embedded in the golf ball rotates at least 180 degrees relative to an antenna of the RFID reader, the ball isolation system including,
   a first separation component includes a first partial disc and a second separation component includes a second partial disc, wherein each of the separation components is operatively coupled to the ball delivery shaft,
   the first separation component configured to rotate and to permit the golf ball to enter the shaft and the second separation component configured to temporarily trap the golf ball between the first separation component and the second separation component along the golf ball delivery shaft, wherein the ball is temporarily trapped within a cutout of the single separation component;

an actuator configured to change the configuration of a gate, the gate configured to control the routing of a golf ball released from the ball isolation system;

a ball separation control system configured to query the RFID reader when the ball is isolated in the ball isolation system;

the ball separation control system configured to communicate with the RFID reader and determine if the trapped ball is an RFID golf ball, and then route the ball to an RFID ball collector;

the ball separation control system configured to communicate with the RFID reader and determine if the trapped ball is not an RFID golf ball, and then route the ball to a secondary location; and the ball isolation system further configured to release the ball after the control system has made a routing determination.

9. The ball separation system of claim 8, wherein the ball isolation system comprises the first separation component above the helix and the second separation component below the helix, the separation components coupled to the ball delivery shaft; and the first separation component and the second separation component configured to rotate to temporarily trap the ball between the first separation component and the second separation component.

10. The ball separation system of claim 8, wherein the ball isolation system is controlled by the ball separation control system.

11. The ball separation system of claim 8, wherein the ball isolation system is controlled by an independent control system.

12. The ball separation system of claim 8, wherein non-RFID golf balls are deposited in a non-RFID golf ball collector.

13. The ball separation system of claim 8, wherein non-RFID golf balls are deposited on the ground.

14. A method for separating golf balls with a golf range target system comprising:

capturing a golf ball in a golf range target, the golf range target comprising a golf ball delivery shaft;

temporarily trapping the ball within the golf ball delivery shaft with a gravity fed ball isolation system;

rotating a single separation component of the ball isolation system such that the ball is temporarily trapped within a cutout of the single separation component;

querying an RFID reader with a ball separation control system when the ball is trapped in the ball isolation system, wherein the ball isolation system includes, a first separation component includes a first partial disc and a second separation component includes a second partial disc, wherein each of the separation components is operatively coupled to the ball delivery shaft, the first separation component configured to rotate to permit a gravity-fed golf ball to enter the shaft, and the second separation component configured to temporarily trap the golf ball between the first separation component and the second separation component along the golf ball delivery shaft;

routing the ball to an RFID ball collector with the ball separation control system, when the RFID reader determines that the trapped ball is an RFID golf ball;

routing the ball to a secondary location with the ball separation control system, when the RFID reader determines that the trapped ball is not an RFID golf ball;

changing the configuration of a gate to control the routing of the golf ball released from the ball isolation system; and releasing the ball after the ball separation control system has made a routing determination and the gate configuration has been changed.

15. The method of claim 14, further comprising rotating the first separation component and the second separation component of the ball isolation system such that a ball is temporarily trapped between the first separation component and the second separation component.

16. The method of claim 14, further comprising controlling the ball isolation system with the ball separation control system.

17. The method of claim 14, further comprising controlling the ball isolation system with the independent control system.

18. The method of claim 14, further comprising depositing non-RFID golf balls in a non-RFID golf ball collector.

19. The method of claim 14, further comprising depositing non-RFID golf balls on the ground.

* * * * *